D. C. McCAN.
MEASURING APPARATUS.
APPLICATION FILED JAN. 26, 1910.

986,730.

Patented Mar. 14, 1911.

3 SHEETS—SHEET 1.

Witnesses

Inventor
David C. McCan
by Anton ......
his Attorney

D. C. McCAN.
MEASURING APPARATUS.
APPLICATION FILED JAN. 26, 1910.

986,730.

Patented Mar. 14, 1911.

3 SHEETS—SHEET 2.

Witnesses

Inventor
David C. McCan
by his Attorney

D. C. McCAN.
MEASURING APPARATUS.
APPLICATION FILED JAN. 26, 1910.
986,730.
Patented Mar. 14, 1911.
3 SHEETS—SHEET 3.
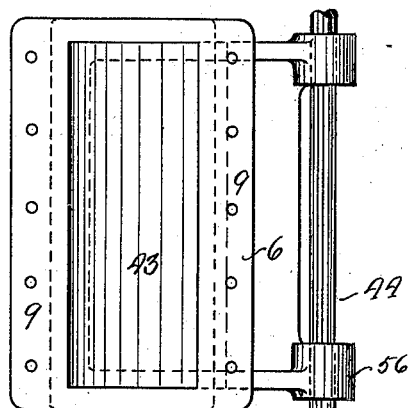
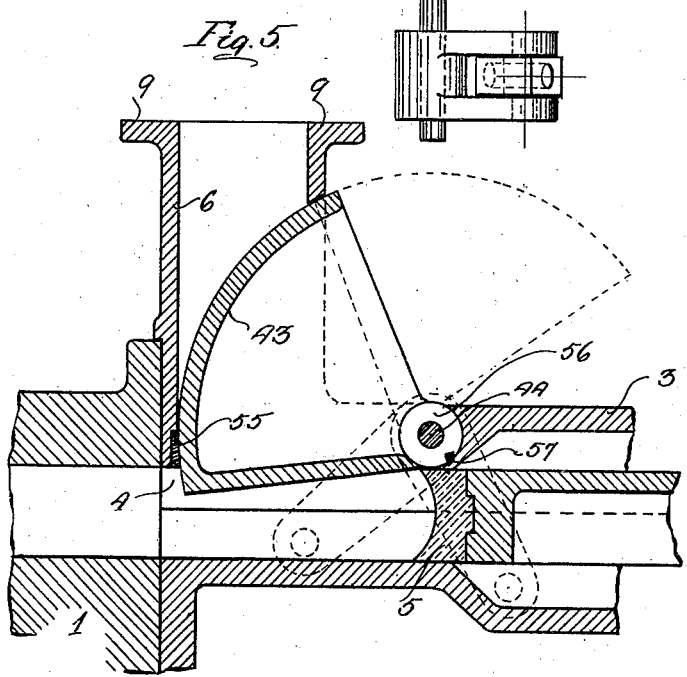
Witnesses
Inventor
David C. McCan
by Anton Glotzner
his Attorney

UNITED STATES PATENT OFFICE.

DAVID C. McCAN, OF LOS ANGELES, CALIFORNIA.

MEASURING APPARATUS.

986,730.　　　　Specification of Letters Patent.　　Patented Mar. 14, 1911.

Application filed January 26, 1910. Serial No. 540,178.

*To all whom it may concern:*

Be it known that I, DAVID C. McCAN, a citizen of the United States, residing at Los Angeles, in the county of Los Angeles and State of California, have invented a certain new and useful Measuring Apparatus, of which the following is a specification.

This invention relates to a measuring device, and has particular reference to a means for determining the quantity of waste material necessary to be fed to a press for making fuel briquets from loose waste, such as wood shavings, sawdust and the like.

The invention also has reference to a means for preventing the packing of the loose material in the delivery chute, and to a mechanism coöperatively connected with a fuel press for inclosing a delivered charge in the feeding bore of a fuel press, whereby to cause all of a predetermined amount of material to be compressed in a final fuel block.

An object of this invention is to provide a measuring apparatus for loose wood waste in which the quantity of material may be regulated during the revolution thereof.

Other objects will appear from the accompanying drawings, specification and claims.

Figure 1:
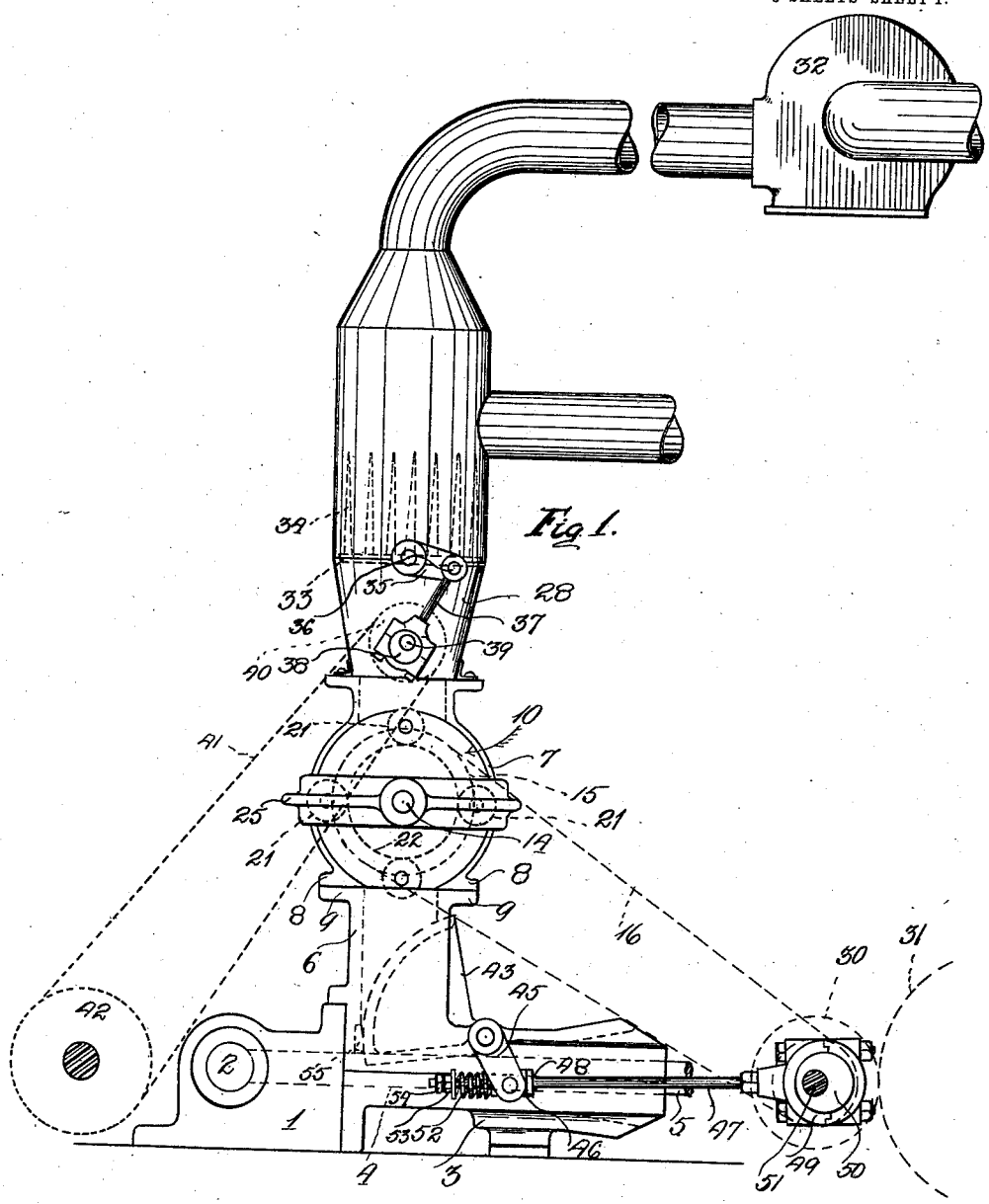
Figure 2:
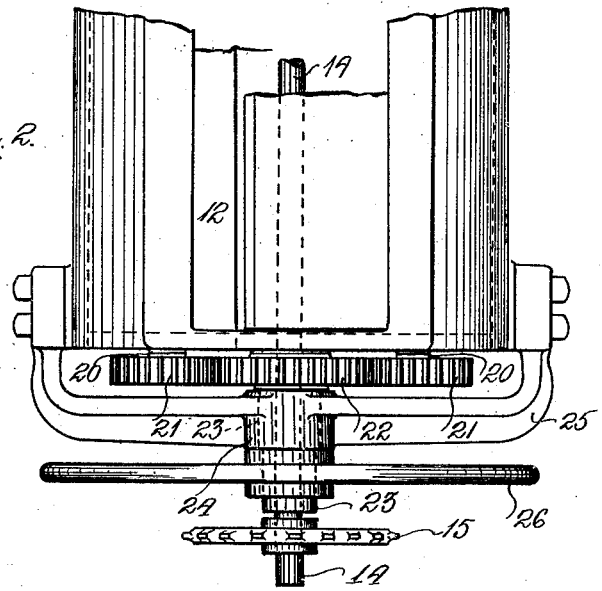
Figure 3:
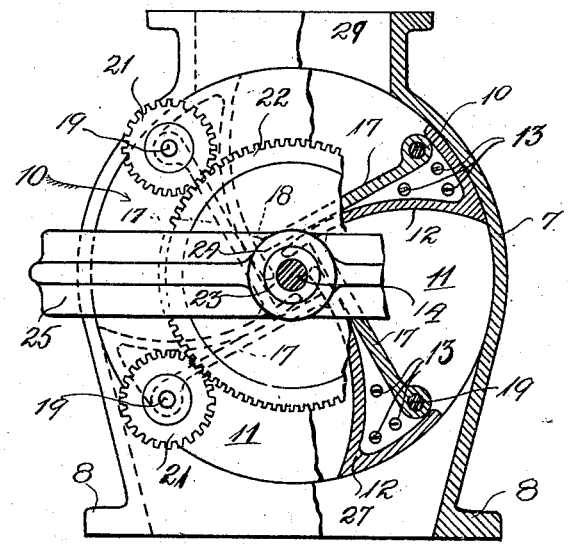

In the drawings, Figure 1, is a side elevation showing a fragment of a feeding plunger, the feed hopper, the segmental weight and gate for shutting off the supply to the feed bore, and means for intermittently operating the same; the measuring apparatus is shown mounted on the feed hopper, and the agitator or loosening means within the end of the delivery chute. Fig. 2, is a fragmentary plan view of the measuring apparatus. Fig. 3, is a side elevation of the same, partly broken to disclose interior construction. Fig. 4, is a plan view of the hopper, the gate operating therein, and the shaft for operating the same, and Fig. 5, is a sectional elevation showing the operative position of the gate in the hopper, the inoperative position being shown in dotted lines.

In the drawings, 1, designates a base provided with a compression chamber 2. At right angles to said compression chamber is a boss 3, provided with a bore 4, in which a plunger 5, operates, and communicating with the bore 4, in said boss 3, is a hopper 6, mounted on the base 1, and the boss 3.

7 designates a housing provided with flanges 8, which are arranged to be fastened to the flanges 9, cast integral with the hopper 6. Within said housing 7, is a drum 10, consisting of end annular disks 11, conjoined by slightly curved vanes 12, which are fastened to said disks by bolts 13. These end disks 11, are mounted on a shaft 14, and are arranged to be rotated by a sprocket 15, fixedly mounted on said shaft 14, and a chain 16, shown in dotted lines Fig. 1. The said curved vanes 12, extend in close proximity to but free of the shaft 14, and the space intervening between the shaft and the end of the vanes, is closed by a plurality of plates 17, which normally lie in engagement with the curves of said vanes, and which are arranged so that their free ends may be moved along the periphery and describe the same arc as that of the vanes, 12. These plates are provided with toe-edges 18, which scrape the loose material from the vanes, and are mounted on arbors 19, extending transversely through them and the end disks 11. On the arbor ends 20, that extend beyond the end of said disks, are mounted pinions 21, which are arranged in mesh with a large gear wheel 22, keyed to a hub 23. This hub 23 is rotatably mounted in a bearing 24, provided therefor in a yoke 25, which straddles and is secured to the end of the housing 7. A hand wheel 26, is keyed onto said hub 23, and by this wheel the position of the plates 17, relatively to the vanes 12, may be changed. The aforementioned shaft 14, which extends through the hub 23, on which the large gear wheel 22, is mounted, has a running fit in said hub. When the shaft is driven, through the medium of the sprocket wheel, the drum, with the curved vanes, plates 17 and gears 21, is rotated, and the large gear 22, sleeve 23 and hand wheel 26, which are rigidly connected together, also rotate, at the same relative speed as the drum and shaft, the larger gear 22 being in mesh with the smaller gears 21 and the frictional resistance of the various parts being sufficient to prevent relative movement of the gears and to cause the gear 22, sleeve 23 and hand wheel 26 to rotate with the drum. To change the angular positions of the plates 17, and thus increase or decrease the capacities of the compartments, the hand wheel may be adjusted while the drum is in motion, or during intervals when it is stopped, and such adjustment of the hand wheel, it is obvious, will turn the sleeve 23 on the shaft and, through the gears 22 and 21, adjust the plates 17, simultaneously. The movement or revolution of said drum is intermittent in order to cause a discharge of the material from one of the compartments at each quarter revolution thereof through the mouth 27, of the housing 7, and at the same time a feeding of the material to another of the compartments from the chute 28, through the throat 29 of the housing 7. The intermittent revolution of the said drum 10, is produced by the intermittent gears 30 and 31, shown conventionally in Fig. 1, they having been fully described in connection with my co-pending application for patent, filed Sept. 22, 1909, Serial No. 519,032, for fuel presses, and the aforementioned chain 16.

Loose material, such as wood waste, shavings, sawdust and the like, compacts very easily, and though delivered in the chute 28 pneumatically by the blower 32, such compact accumulation in the discharge end of the chute cannot be avoided unless mechanical means be employed. Such a means is shown in Fig. 1, and comprises a plate or bar 33, provided with a plurality of spikes 34 on its upper surface, and mounted, within the chute, upon a rock-shaft or spindle 36. The supporting plate or bar for the spikes should be narrow, as compared with the diameter of the chute, in order to permit the waste material to travel through the chute, past the plate. The spiked plate or bar is rocked by means of a link 35, secured to the rock-shaft 36, and connected to a rod 37 which is reciprocated by an eccentric 38 fixed on a shaft 39, which latter shaft is rotated by means of a pulley 40, chain or belt 41 and the pulley 42. Thus as the spindle is rotated, the spiked plate is oscillated, loosening thereby the mass of shavings collected in the chute, which shavings then fall through the spaces between the spikes 34.

Uniform compression of the blocks or briquets cannot be attained unless all of the material deposited from one of the compartments of the drum 10 is forced into the bore 4, at each operation of the plunger 5. As the operation of the plunger tends to buckle the material and compress some of it out of the path of the plunger and into the hopper 6, I have provided means, more particularly illustrated in Figs. 4 and 5, for preventing this occurrence, and for insuring the compression of all of the material in each charge deposited in said bore from the compartments of the drum. A segment 43 is rigidly mounted on a pin or pivot 44 in the boss 3, said segment being arranged to operate in an opening provided therefor in the hopper 6, and to extend into the bore 4, and into the path of the plunger 5. A link 45, is connected with said segment and with a sleeve 46, which is slidably mounted on a rod 47, having a collar 48, against which the said sleeve normally abuts. The said rod 47, is connected to a boxing 49 in which is inclosed an eccentric 50, which is fixed on a shaft 51, intermittently actuated by the intermittent gears 30 and 31.

In the positions indicated in Figs. 1 and 5, the plunger is about to travel forward. In so doing it engages the face of the segment 43, which projects into the bore of the boss 3, and forces it upwardly, the link 45, meanwhile traveling with said segment and compressing the spring 52, which is coiled about the rod 47, and held against displacement by nuts 53 and 54. Thus the forwardly traveling plunger forces all of the material into the compression chamber 1, while the knife 55, on the inside of the hopper 6, removes all particles of wood shavings from the same. The hub 56 of the segment is also provided with a knife or scraper 57, which is arranged to remove all of the adhering particles from the plunger during its recession. At the completion of the compression stroke of the plunger the segment is in the dotted position shown in Fig. 5, and a new charge of material then enters the hopper 6. As the plunger moves outward, the segment returns to the position shown in full lines, Fig. 5, and holds the material in line with the plunger for the next operation.

From the above description, it will be seen that the segment acts not only as a gate to prevent additional material from entering the hopper, but also serves to press the wood shavings firmly into the bore of the feed plunger, and hold such wood shavings therein by positive action until the feeding plunger has delivered the charge to the compression chamber.

What I claim, is:—

1. The combination with a housing having receiving and discharge openings, of a drum rotatably mounted within said housing and provided with a plurality of compartments, a series of pivoted plates, one in each compartment, and means for simultaneously adjusting said plates to vary the capacities of said compartments.

2. The combination with a housing having receiving and discharge openings, of a drum rotatably mounted within said housing and having a series of curved partitions extending from the central portion of the drum to its periphery and dividing the drum into compartments, a series of plates, one in each compartment, pivoted upon axes concentric with the concave sides of said partitions and extending into proximity to such sides, and means for simultaneously adjusting said plates to vary the capacities of said compartments.

3. The combination with a housing having receiving and discharge openings, of a suitably journaled shaft in said housing, a drum on said shaft having a series of curved partitions extending from the central portion of the drum to its periphery and dividing the drum into compartments, a series of arbors, one in each compartment, arranged at the centers of curvature of said partitions, plates upon said arbors extending into proximity to the concave faces of said partitions, pinions upon said arbors, a gear mounted on said shaft and engaging all of said pinions, and a hand wheel connected to said gear.

4. The combination with a housing having a receiving throat and a discharge mouth, of a drum journaled within said housing and provided with a plurality of compartments, arbors extending through said drum, a plurality of plates fixed to said arbors and lying within said compartments, pinions on said arbors, a gear wheel in mesh with said pinions, a hand wheel to rotate said gear wheel whereby to cause said plates to move relatively to said compartments, and means to rotate said drum.

5. The combination with a housing having a receiving throat and a discharge mouth, of a drum rotatable in said housing and provided with a plurality of compartments, a plurality of plates journaled within said drum, pinions to move said plates to regulate the capacity of said compartments, a sprocket to revolve said drum, and means to operate said pinions independently of said drum.

6. The combination with a housing having a receiving throat and a discharge mouth, of a drum having a plurality of compartments, a plurality of plates, one journaled in each of said compartments, pinions on the journals of said plates, a yoke secured to the end of said housing, a hub rotatably mounted in said yoke and provided with a gear wheel arranged in mesh with said pinions, a hand wheel on said hub to operate said gear, and a shaft extending through said hub and forming a fixed mount for said drum, said shaft being provided with a driving means for the same.

In testimony whereof I affix my signature in the presence of two witnesses.

DAVID C. McCAN.

Witnesses:
H. J. PINNEY,
R. D. MIDDLETON.